United States Patent
Ducret (10) Patent No.: US 6,308,417 B1
(45) Date of Patent: Oct. 30, 2001

(54) TOOL FOR SEPARATING AND REMOVING CABLE JACKETS AND INSULATION FROM CABLES

(76) Inventor: Lucien C. Ducret, Nine Tod's Driftway, Old Greenwich, CT (US) 06870

( * ) Notice: Subject to any disclaimer, the term of this patent is extended or adjusted under 35 U.S.C. 154(b) by 0 days.

(21) Appl. No.: 09/412,849

(22) Filed: Dec. 16, 1999

(51) Int. Cl.$^7$ ............................. B21F 13/00; H02G 1/12
(52) U.S. Cl. ............................. 30/90.7; 30/90.8; 30/90.9
(58) Field of Search ................................. 30/90.1, 90.4, 30/90.6, 90.7, 90.8, 90.9

(56) References Cited

U.S. PATENT DOCUMENTS

| | | | | |
|---|---|---|---|---|
| 843,353 | * | 2/1907 | McKenna | 30/90.6 |
| 2,346,227 | * | 4/1944 | Martin et al. | 30/90.9 |
| 2,778,105 | * | 1/1957 | Carta | 30/90.7 |
| 3,599,514 | * | 8/1971 | Fornkahl | 30/90.6 |
| 3,665,603 | * | 5/1972 | Bilbrey et al. | 30/90.7 |
| 3,946,487 | * | 3/1976 | Bieganski | 30/90.7 |
| 4,104,791 | * | 8/1978 | Sunahara | 30/90.1 |
| 4,489,490 | * | 12/1984 | Michaels et al. | 30/90.1 |
| 4,955,137 | | 9/1990 | Matthews | 30/90.1 |
| 5,301,426 | | 4/1994 | Regan | 30/90.9 |
| 5,487,220 | * | 1/1996 | Saitou | 30/90.6 |
| 5,809,652 | | 9/1998 | Ducret | 30/90.7 |

* cited by examiner

Primary Examiner—Hwei-Siu Payer
(74) Attorney, Agent, or Firm—St. Onge Steward Johnston & Reens LLC (57) ABSTRACT

A cable stripper tool enabling an operator to quickly change from making a circumferential cut of a cable to a liner cut without repositioning the cable stripper tool on the cable includes a blade positioning assembly, a blade penetration assembly and a cable guide assembly. The blade positioning assembly is adopted to efficiently move the blade linearly for penetrating the insulation at a predetermined distance set by the dial assembly while the tool is clamped to the cable to perform a circumferential cut upon relative rotation of the tool and the cable. The blade further is retracted to be turned by the blade positioning assembly at a 90° angle with a rotary cam action to be further axially propelled to penetrate the cable at the same predetermined distance to perform a linear cut without dismounting the cable.

36 Claims, 6 Drawing Sheets

TOOL FOR SEPARATING AND REMOVING CABLE JACKETS AND INSULATION FROM CABLES

FIELD OF THE INVENTION

The present invention relates to a tool for producing circular and/or linear cuts of a cable's end in one operation. Particularly, the invention relates to a hand-held device for stripping end portions of cable jackets by a rotatable blade that controllably penetrates the cable jackets at a predetermined uniform depth during subsequent circumferential and linear cuts.

SUMMARY OF THE INVENTION

Cables having relatively thick cable jackets are difficult to prepare for connections since conventional cutting means such as knives or tools with enclosed blades are inefficient for stripping cable jackets. A plurality of stripping tools has been developed so as to efficiently deal with cables having relatively thin cable jackets.

U.S. Pat. No. 5,809,652 to Ducret discloses a stripping apparatus for jackets having a cable receiving portion, a slidable carriage which has a rotatable cutting member adjustable so as to penetrate the cable's jacket at a predetermined depth. In order to perform circumferential, longitudinal or/and helical cuts of the cable's jacket one must rotate cable stripping apparatus between different positions and periodically reposition a cable so that a desirable cut can be produced.

U.S. Pat. No. 4,955,137 to Matthews discloses a stripping tool including a clamping member positioning a cable to be stripped off a jacket an a cutting assembly freely rotatable to produce different cuts and controllably adjustable to penetrate the jacket at a desirable depth.

U.S. Pat. No. 5,301,426 discloses a stripping tool including a plurality of differently sized, independently rotatable sheaves and a depth adjustable cutter which is freely rotatable and is movable relative to a spool member so as to have a cable jacket cut at a desirable depth.

Inasmuch as some existing tools have a rotating blade to perform ring cuts and straight cuts in one operation, they only work on thin cable jackets. Still other known devices, which are capable of preparing thick cable jackets, are bulky and do not lend themselves to making connections in tight quarters.

Accordingly, what is desired is a stripping device, which suitably severs the jackets off a variety of cables with high precision and without repositioning a cable in the device so as different cuts can be performed in one operation.

SUMMARY OF THE INVENTION

With a cable stripper in accordance with the invention, one can suitably strip relatively thick jackets of cables in tight quarters by setting a desirable blade penetration that remains unchanged during controllable displacement of a blade performing subsequent circumferential and axial cuts.

This is implemented according to one aspect of the invention, wherein a cable stripper has a cable adjustment assembly that moves along a support to accommodate differently sized cables and has a dial member defining a uniform blade penetration during subsequent circumferential and axial cuts of a cable's jacket.

Adjustment of the cable stripper can be provided in a stepwise manner. First, the invention teaches a push button system for rapidly adjusting the stripper to enable differently sized cables to be gripped. Second, upon completing rapid adjustment, a fine adjusting system permits a precise adjustment of the blade penetration creating a no-play condition on a clamped cable and keeping an accurate blade penetration.

Upon penetration through the jacket at a desirable depth, the blade is positioned to provide either a ring cut or an axial cut. In accordance with another aspect of the invention, the cable stripper is provided with a blade retracting assembly allowing repositioning of the blade so as to make these ring and axial cuts in sequence without removing a cable from the stripper. The blade retracting assembly converts rotational displacement of a blade holder into a linear retraction of the blade from its initial cutting position. Upon further rotation of the blade holder, the blade is guided angularly and then again linearly to penetrate the jacket at the preliminarily established depth to orient itself at a 90° angle with respect to the initial position. As a consequence of this displacement, the blade is able to slice the jacket along its longitudinal axis upon pulling the cable away from the cable stripper.

According to still anther aspect of the invention, the cable stripper has further a generally V-shaped bottom provided with a plurality of rollers which are preferably arranged to form a generally X shape. The rollers permit the rotation of the cable stripper radially when performing ring cuts, and after turning the blade at a 90° angle to a straight cut position, the rollers allow the user to pull the cable stripper axially with effective lower friction.

It is therefore an object of this invention to provide a cable stripper, which is capable of stripping cable jackets with high precision.

It is another object of the invention to provide a cable stripper capable of cutting a cable's jacket in a sequentially manner, i.e., circumferentially and linearly.

It is still another object of the invention to provide a cable stripper that enables self-adjustment to clamp differently sized cables to be stripped.

It is a further object of the present invention to provide a cable stripper allowing relatively easy displacement of a cable to be stripped in mutually perpendicular planes relative to the cable stripper in a clamped position of the cable.

It is another object of the present invention to provide a cable stripper that is compact and lends itself perfectly to making connection inside a panel box, even with large diameter cables.

Yet another object is to provide a method for operating the cable stripper according to the invention, so as to produce sequential cuts of the cable's jacket in an economical and efficient manner.

SPECIFIC DESCRIPTION

Figure 1:
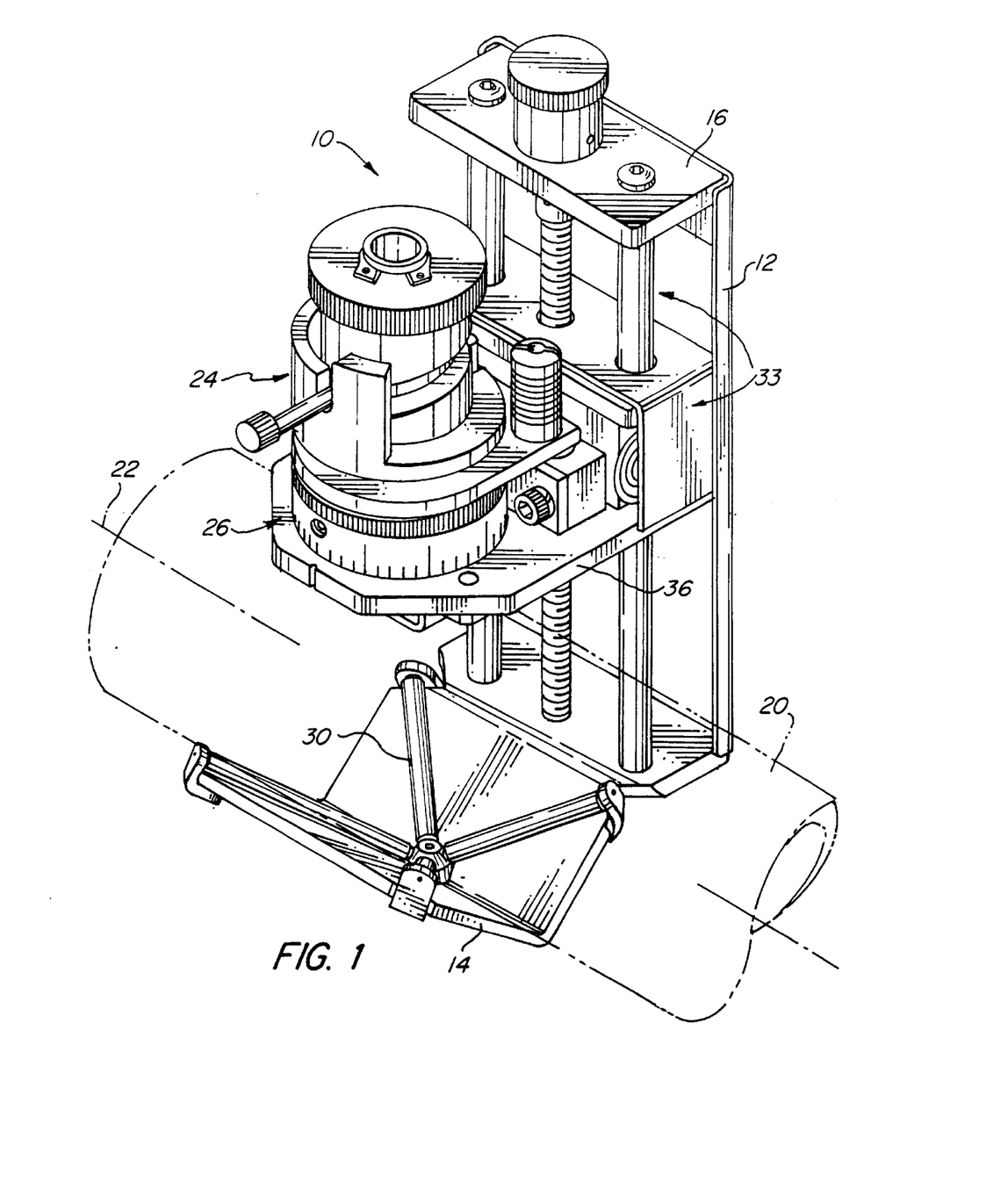
FIG. 1 is an isometric view of a cable stripper according to the invention.

Referring to FIG. 1, a cable stripper is shown and generally indicated by numeral 10. The cable stripper includes a support 12 extending along a longitudinal axis 18 and formed with a base 14. It should be noted that for the sake of clarity, a top 16 is indicated as an outer end, whereas the base 14 is referred to as an inner end. Also, axial end regions of all of the components of the cable stripper pointing toward the top 16 are denoted as outer ends, regions, etc. Conversely, all end regions and ends of the cable stripper's details facing the bottom 14 are referred to as inner ends. Further, the components and parts of the cable stripper may not be shown and/or marked in all of the drawings.

As has been mentioned before, the cable stripper according to the present invention performs at least two cuts including a circular cut and a linear cut. In order to perform the circular cut, the cable stripper 10 and a cable 20, as is seen in FIG. 1, rotate relative each other along an axis 22 of the cable 20. Further relative axial displacement of these two elements along the axis 22 results in a linear cut.

Figure 2:
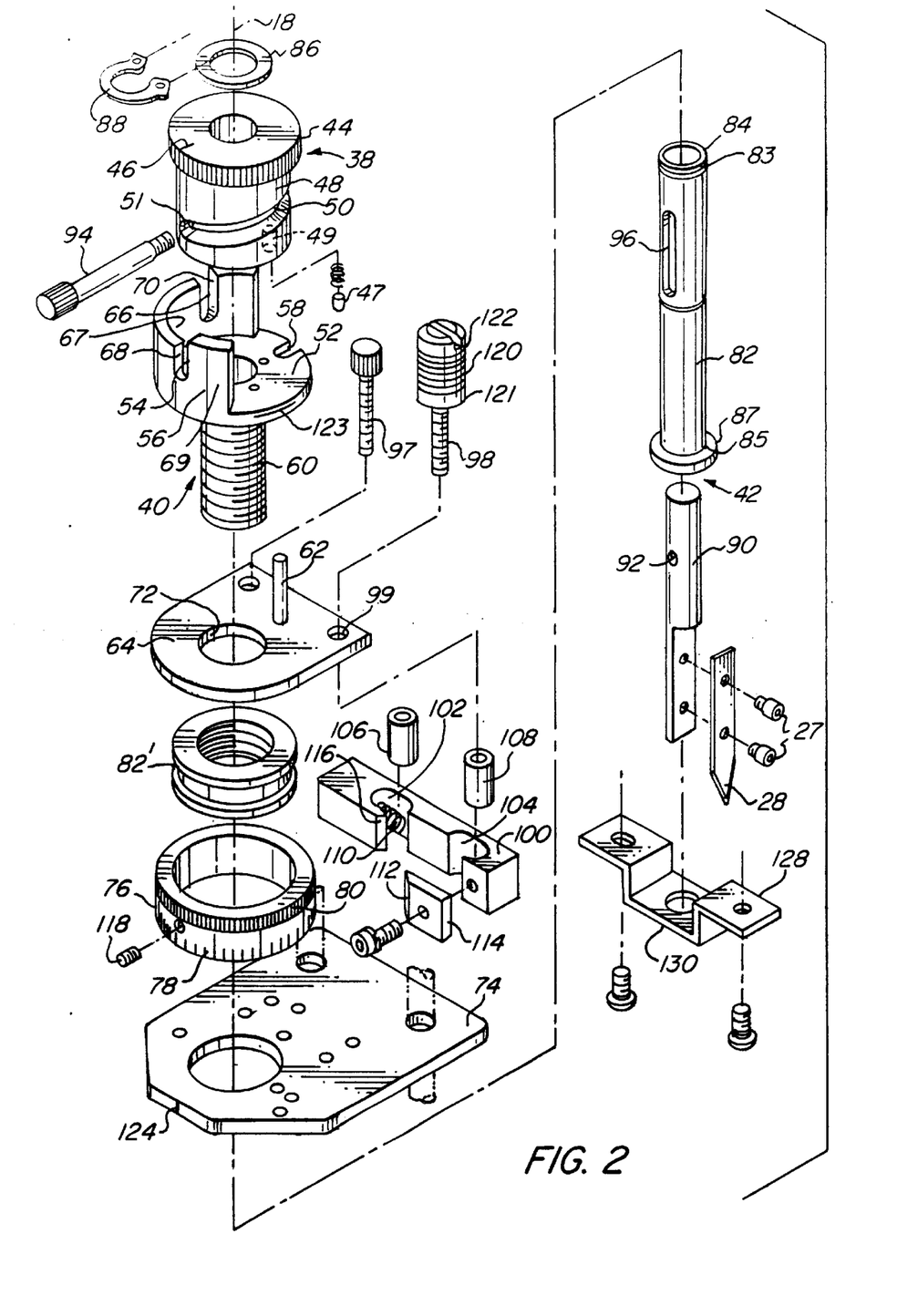
FIG. 2 is an exploded view of the cable stripper of FIG. 1.

Turning specifically to FIG. 1, the cable stripper 10 is comprised of a blade actuating assembly 24 adapted to angularly and axially displace a blade 28 (FIG. 2). The cable stripper further comprises a rotary dial assembly 26 setting a predetermined distance at which the blade 28 penetrates a jacket of the cable 20, and a cable guide assembly 30 which is provided on the base 14. A reference numeral 33 denotes a cartridge displacement assembly providing subsequent rapid motion of and a fine adjustment of a cartridge assembly 36 along the support 12.

Figures 3, 4:
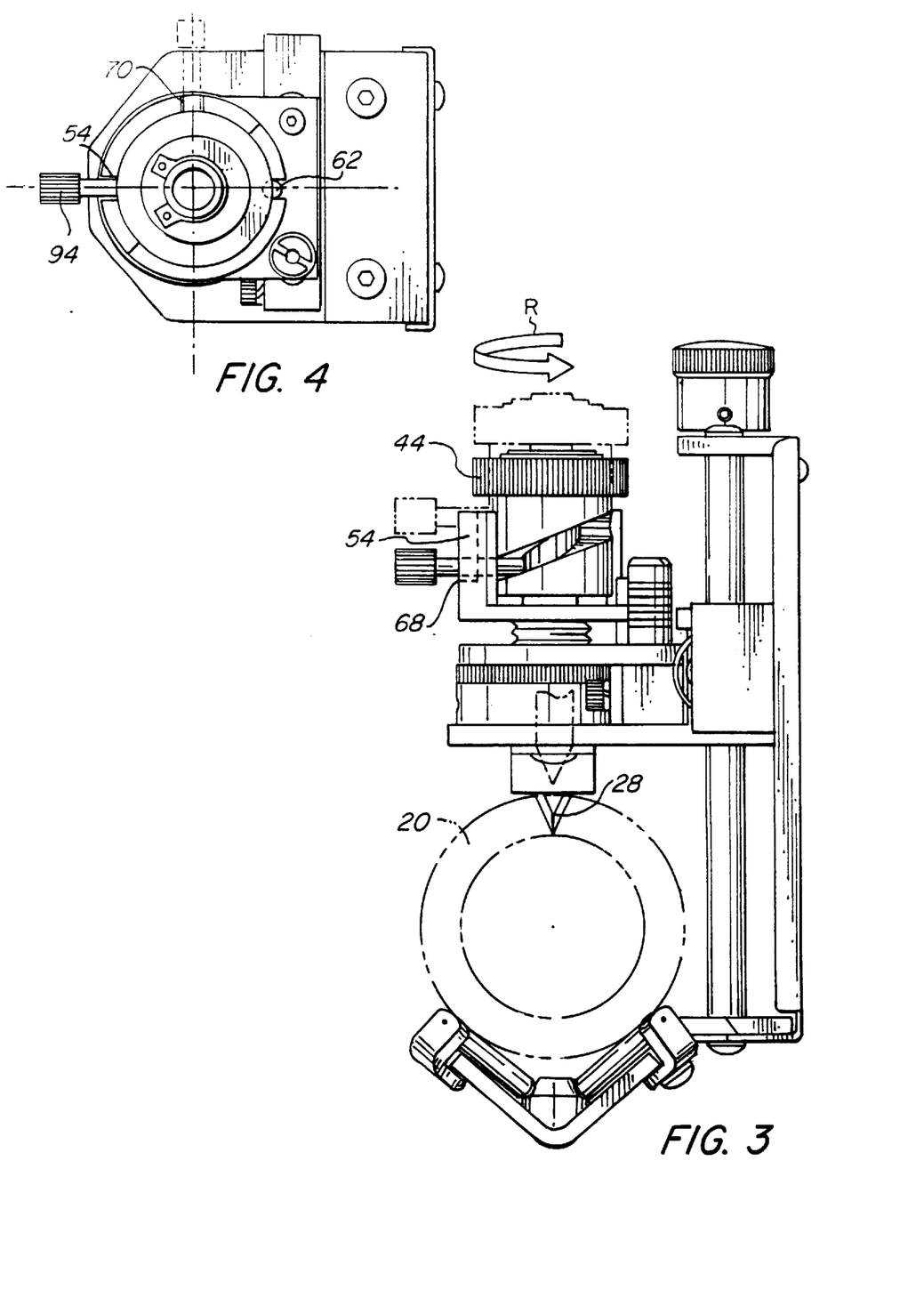
FIG. 3 is a side view of the cable stripper of FIG. 1.
FIG. 4 is a top view of a blade actuating assembly.

Referring to FIGS. 2–4, in accordance with one aspect of the present invention, the blade actuating assembly 24 comprises a blade positioning member 38, a drum member 40 adapted to guide the blade 28 axially and a blade assembly 42.

In order to provide a plurality of cuts of the cable's jacket, the blade positioning member 38 enables the blade 28 to be angularly displaced between at least two positions wherein respective cuts are performed, as will be explained hereinbelow. Particularly, the blade positioning member 38 is formed with a blade knob 44 having a peripherally knurled outer surface 46 which is adapted to provide reliable finger contact upon applying a rotational torque to the positioning member. The blade knob 44 is provided with a hollow knob sleeve 48, which is preferably formed integrally with the knob, having a cam spiral groove 50 that extends between different axial planes and is recessed along a substantial part of the sleeve's circumference.

The drum member 40 provides axial displacement of the blade position member 38 in response to rotation of the dial assembly 26. The drum member includes a flange 52 and a curved surface 56 extending axially outwardly from the flange. The surface 56 is formed along a part of the flange's periphery to allow the drum member to be guided along a pin 62 formed on an outer plate 64 of the cartridge assembly 36 and cooperating with a recess 58 of a rear part of the flange's periphery. As better seen in FIG. 4, besides axially guiding the drum member, the pin 62 prevents its rotation thus enabling the drum member to move only axially. Axial recesses 66 and 68 formed in the surface 56 are spaced apart at a 90° angle, so as to define two perpendicular cutting planes corresponding to circumferential and linear cuts respectively performed by the blade 28. The axial recesses 66, 68 define a segment 67 of the surface 56 that is axially shorter than segments 69 which serve as angular stops 54, 70 arresting angular displacement of the blade 28, as will be explained hereinbelow.

The drum member 40 is further formed with a hollow drum sleeve 60 provided with an external thread and, preferably, made out of brass. As illustrated, the drum sleeve 60 is formed unitarily with the flange 52. It is conceived within the scope of the present invention to have these parts formed separately, so as to be able to provide the surface 56 with variously numbered and shaped recess arrangements each corresponding to a respective cutting plane.

The outer plate 64 of the cartridge assembly 36 provides centering of the drum sleeve 60 by having a hole 72 traversed by this sleeve and shaped to serve as a support surface for the flange 52 in a zero bade penetration position, as will be explained below.

The dial assembly 26 mounted between the outer plate 64 and an inner support plate 74 of the cartridge assembly 36 includes a rotary dial 76 controllably displaceable upon applying a rotational torque and formed with at least one measuring scale 78 that indicates a blade penetration. The scale can be graduated in thousandths of an inch or it can be graduated in metric sizes when using the preferred thread pitch of 0.40 per turn or 1 mm. The surfaces of the outer plate 64 and inner support plate 74 facing each other slidably engage the rotary dial 76 so as to prevent displacement of the dial with respect to the axis 18 during application of the rotational torque. A textured surface 80 of the rotary dial is used as a means for locking the dial assembly upon establishing the desired blade penetration, as is explained hereinbelow.

An internally threaded ring 82' rotationally engaging the drum sleeve 60 provides axial displacement of the drum member 40 and the blade position member 38 during displacement of the rotary dial with respect to the cartridge assembly 36. Thus, angular displacement of the rotary dial defined by the scale 78 is translated into axial motion of the blade-positioning member 38 and of the blade 28 relative to the cartridge assembly 36 at a distance corresponding to a desirable blade penetration.

The blade assembly 42 extends through the blade actuating assembly 24 to center it on the axis 18 and includes a blade sleeve 82 axially connecting the blade positioning, drum and dial members to the cartridge assembly 36 for mutual axial displacement. In order to provide an outer axial contact between the blade sleeve and actuating assembly, an outer axial end 83 of the sleeve is formed with circumferential grooves 84 rotatably engaged by a thrust washer 86 and an arcuate washer 88 suspending the sleeve axially in the actuating assembly 24. An inner end 85 of the blade sleeve 82 has a radially extending flange 87 that abuts an inner end of the drum sleeve 60 thereby providing an inner axial contact between the blade actuating 24 and the blade sleeve 82 which are axially coupled for further axial displacement.

The blade 28 removably mounted to a blade support 90 by means of fasteners 27 freely slides through the blade sleeve 82 and has a threaded slot 92. A lever 94 extending through the cam spiral groove 50 and an axial slot 96 of the blade sleeve is screwed in the slot 92, so as to have the blade support 90 and the blade actuating assembly axially and rotatably fixed for angular displacement between axial recesses 66, 68. Having reached either of these axial recesses, the lever 94 is pressed upon by the stop 54, 70 to move inwardly axially by the cam spiral groove 50 along the recess as the blade position member 38 continues to rotate in a direction of an arrow R (FIG. 3).

In order to prevent accidental blade retraction during use, the cam spiral groove 50 has a flat portion 51 extending approximately along a 10–20° segment on each of its ends. The knob sleeve 48 has a channel 49 formed in the sleeve's bottom and receiving a spring loaded pin 47 that extends from this channel and presses against the flange 52 of the drum member 40. As a consequence, as the blade penetrates the cable's jacket, the lever 94 is kept against an outer surface of the cam spiral groove 50 thus removing any blade backlash so as to ensure the utmost blade penetration precision.

Figure 12:
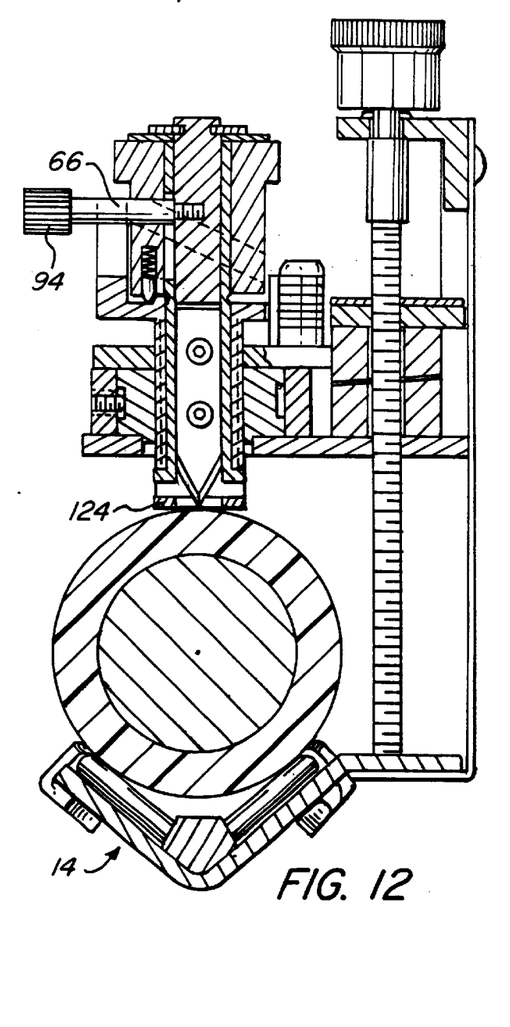
FIG. 12 is an axial cross-sectional view of the cable stripper of FIG. 1, wherein the blade actuating assembly is illustrated in its clamping position.

Referring to FIGS. 3, 4, 12 and 13, in order to strip the cable 20 off its jacket, an operator manipulating the dial assembly 26 sets a desirable blade penetration upon clamping the cable between the base 14 of the cable stripper and the cartridge. In this position, as shown in FIG. 12 and illustrated by phantom lines in FIG. 3, the blade knob 44 is aligned with the axial recess 66.

Figure 13:
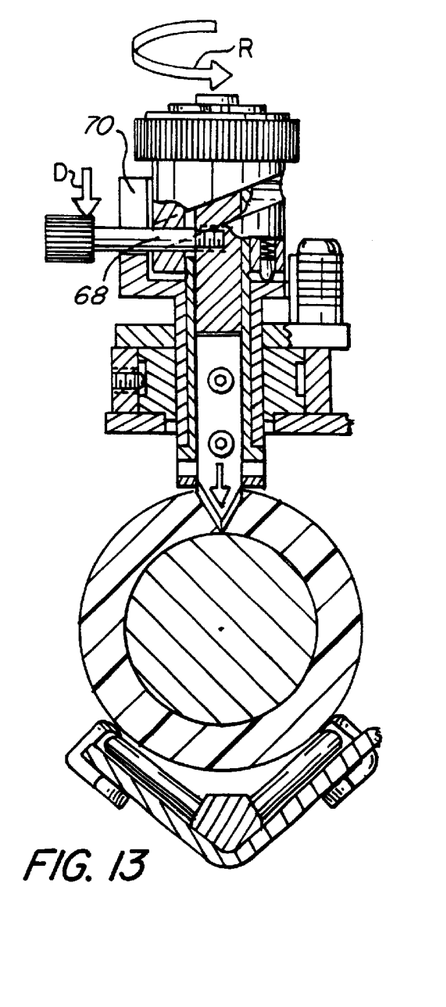
FIG. 13 is an axial cross-sectional view of the cable stripper of FIG. 1, wherein the blade actuating assembly is illustrated in its cutting position.

Then, while rotating the blade knob 44 in the direction "R", as seen in FIGS. 3 and 13, an operator brings the lever 94 in alignment with the axial recess 68. Upon further rotation of the blade knob 44, the lever 94, which is prevented from further rotation by the stop 54, moves axially along the axial recess 68 in a direction D towards a cutting position wherein the blade 28 penetrates the cable's jacket to make a circular cut. Since the blade cannot rotate on itself while buried in the cable's jacket or insulation, in order to position the blade for a linear cut, rotation of the blade knob 44 in an opposite direction moves the lever outwardly and displaces it towards the axial groove 66. Upon placement of the blade in this groove, it is spaced at a 90° angle from a position defined by the recess 68, so as to be able to perform a linear cut along the cable axis 22 after the blade has been axially inwardly guided along the stop 70. Since the lever 94 is aligned with a cutting edge of the blade, it always indicates the position of the blade while performing the stripping action.

The blade actuating assembly 24 has a pair of fasteners 97, 98 that extend through holes 99 formed in the outer plate 64 of the cartridge assembly 36 and further extend through a dial stop 100. The dial stop 100 has a pair of recesses 102, 104 sized to receive sleeves 106, 108 traversed by shanks of the fasteners 97, 98 that have its inner ends secured in the inner support plate 74 of the cartridge assembly 36.

Figure 14:
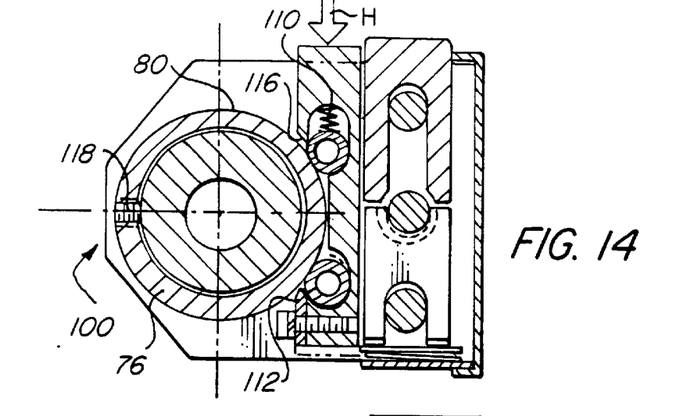
FIG. 14 is a top cross-sectional view of a rotary dial assembly of the cable stripper of FIG. 1.

According to another aspect of the present invention shown in FIGS. 2 and 14, the rotary dial 76 of the dial assembly 26 is locked in a desired angular position upon setting a predetermined blade penetration by the dial stop 100. Forcible displacement the dial stop 100 in a direction H against a force exerted by a spring 110 and away from the textured surface 80 of the rotary dial 76 enables the cutter to rotate upon applying a rotational torque. Having set a desired blade penetration indicated by the scale 78, an external force is removed so as to allow the spring 110 to bias the stop back to its locked position, wherein an edge 112 of a wedge plate 114 latches into the textured surface 80. The wedge plate 114 removably attaches to the dial stop 100, although it is possible to form the wedge plate 114 integrally with this stop. A slanted surface 116 defining the recess 102 conforms to a peripheral surface of the rotary dial 76 thus not affecting rotation of this dial in its release position.

According to yet another aspect of the present invention also shown in FIGS. 2 and 14, a set screw 118 enables the rotary dial 76 to be rotatably disengaged with the externally threaded ring 82 to allow the blade to be reset. A zero blade penetration setting may be provided by displacing the dial stop 100 to the release position of the dial, so as to enable the drum member 40 to move axially to its upward position, wherein the blade lies flush with a bottom 130 of a blade guard 128. If the set screw 118 is not positioned adjacent to a zero mark 124 of the inner support plate 74 in the initial position, it is loosened so as to enable the rotary dial to rotate to a position, wherein the set screw is aligned with the zero mark 124. During further use, however, the blade 28 experiences wear affecting the zero blade penetration setting that can be corrected by following the above-described procedure. Following the above-described procedure, the wear can be easily compensated by periodic readjustment of the zero position.

As illustrated in FIG. 2, The fastener 98 is formed with a side post 121 having a plurality of peripheral marks 120 which correlates directly to a number of turns of the rotary dial 76 and gives the total blade penetration. As the drum member is displaced in its upward position in the zero position of the blade, an indicator 123 formed on a periphery of the flange 52 of the drum member is aligned with an upper mark 122 of the side post 121. Angular displacement of the dial 76 bringing the blade to a desirable penetration position causes the drum member to slide along the side post at a distance corresponding to a number of marks 120 passed by the indicator 123 and correlating directly to the position of the blade.

Referring to FIGS. 6–11, in accordance with another aspect of the present invention, the cartridge displacing assembly 33 is shown and generally includes a rapid adjustment mechanism 32 and a fine adjustment mechanism 34. The rapid adjustment mechanism 32 is adapted to operatively displace the cartridge assembly 36 in a clamping position, wherein variously sized cables can be secured between the base 14 and the underside of the inner support plate 74. This mechanism 32 includes a housing 132 extending in a plane perpendicular to the longitudinal axis 18. The housing 132 has a plurality of openings 134, 136, 138, wherein the opening 138 is traversed by a lead screw 140 and by one of the poles 142, and the other openings 134, 136 are traversed by another pole 142.

Figure 10:
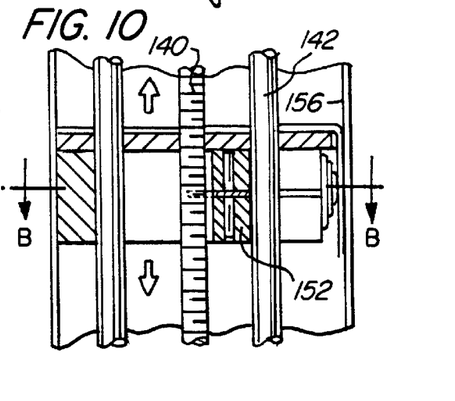
FIG. 10 is a cross-sectional view of the cartridge assembly of FIG. 8 shown in a release position of the cartridge.
Figure 11:
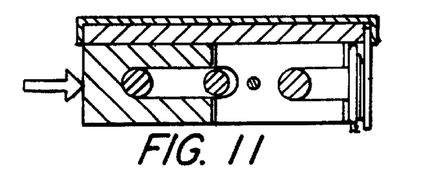
FIG. 11 is a cross-sectional view of the cartridge assembly of FIG. 10 taken along lines B—B.

The housing 132 is biased along an axis 148 towards the lead screw 140 thereby arresting rapid axial displacement of the cartridge assembly 36 in its locked position, as shown in FIGS. 10 and 11. Upon applying an external force, the housing 132 shifts away from its locked position so that the cartridge assembly is able to continue axial displacement along the support 12.

To realize the above described displacement, a laterally open housing end formed with the recess 136 further has a slit 150 that slidably receives a stop plate 152. The recess is sized to extend towards the leading screw 140, so as to enable the stop plate 152 to press against a thread of this screw by its end 154 in the locked position of the rapid adjustment mechanism 32. The end 154 is shaped complementary to a periphery of the screw engaged, while an opposite end 153 of the stop plate 152 is also recessed to conform to a peripheral surface of the pole 142 in the release position of the rapid adjustment mechanism 32.

Figure 8:
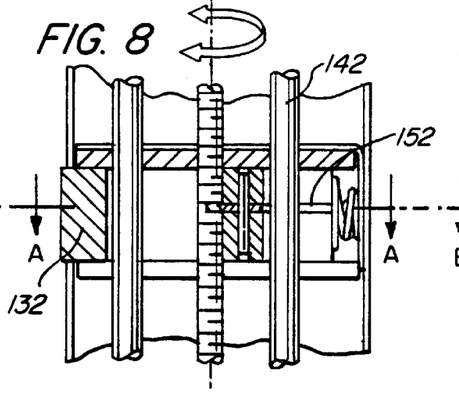
FIG. 8 is a cross-sectional view of a cartridge stop assembly shown in a locked position of the cartridge and taken along lines D—D of FIG. 5.
Figure 9:
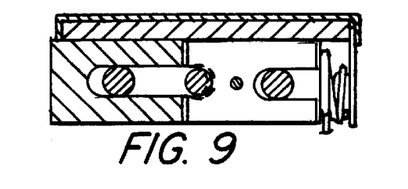
FIG. 9 is a cross-sectional of the cartridge assembly of FIG. 8 taken along lines A—A.

Completing the rapid adjustment mechanism is a spring 146 that is braced between the recessed end 153 of the stop plate and a generally L-shaped bracket 156 which is mounted atop the housing 132 and is juxtaposed with the recessed end. As shown in FIGS. 8 and 9, the stop plate 152 engages the lead screw as a result of the spring force, thereby preventing the cartridge assembly 36 from rapid displacement along this lead screw. Preferably, the lead screw has a square thread receiving between its turns the end 154 of the stop plate.

FIGS. 10, 11 illustrate the release position of the cartridge assembly reached upon pressing the housing 132 toward the L-shaped plate 156 so as to enable the end 154 of the stop plate to disengage from the lead screw. As a result, the end 153 of the stop plate slides along a smooth surface of the pole 142 and the whole cartridge assembly is easily axially adjusted to retain the cable in the clamping position.

Figures 5, 6, 7:
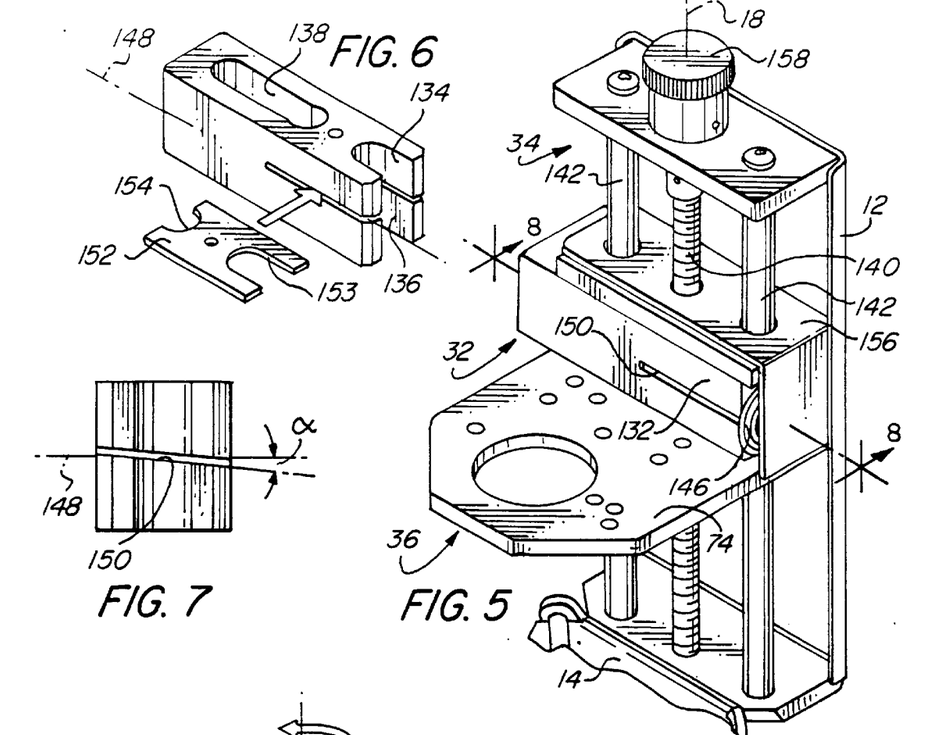
FIG. 5 is an isometric view of a support of the cable stripper of FIG. 1.
FIG. 6 is an exploded view of a cartridge stop housing.
FIG. 7 is a schematic view of the cartridge stop of FIG. 6 showing an angularly arranged slot receiving a stop plate.

Once the clamping position has been reached, the housing returns to its initial position shown in FIGS. 8, 9 and further axial displacement of the cartridge assembly is provided by the fine adjustment mechanism 34. This mechanism includes the already described lead screw 140 having a knurled button 158 mounted rotatably fixed on another end of the screw. As illustrated in FIG. 7, the slit 50 extends at an angle a with respect to the axis 148 of the housing 132, so as to allow the stop plate 152 engaged with the thread of the lead screw to be axially guided upon rotation of the knurled button 158. Such fine adjustment creates a no-play condition of the cable and keeps an accurate blade penetration.

Figure 15:
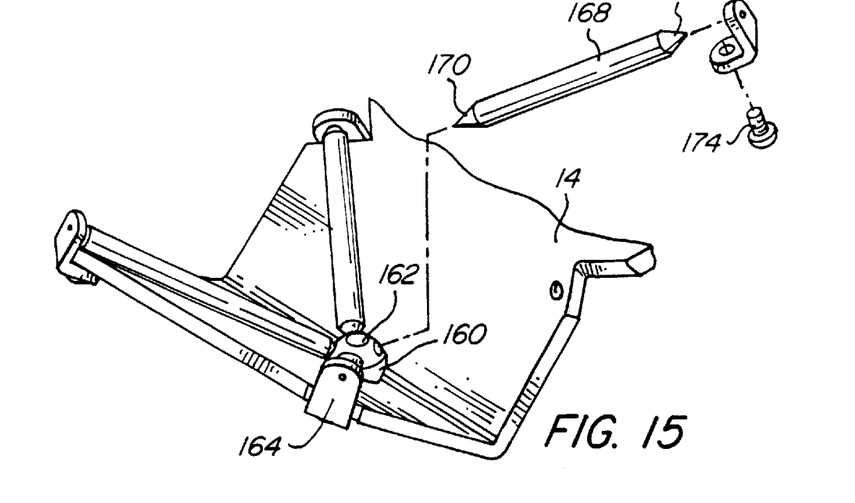
FIG. 15 is an isometric view of a support base provided with a cable guide.
Figure 16:
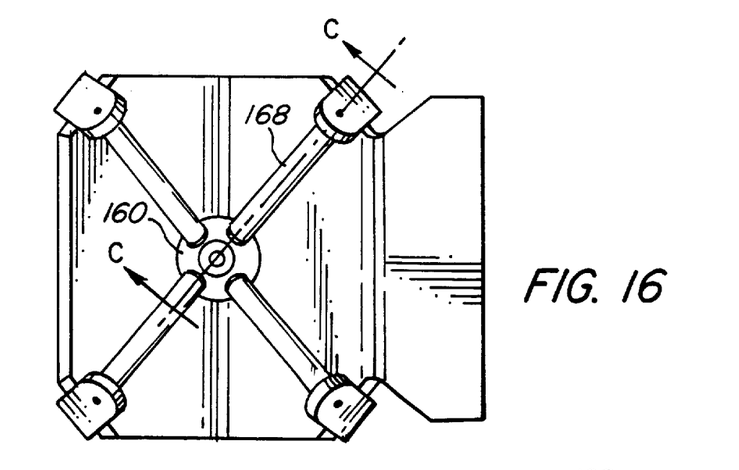
FIG. 16 is a top view of the support base.
Figure 17:
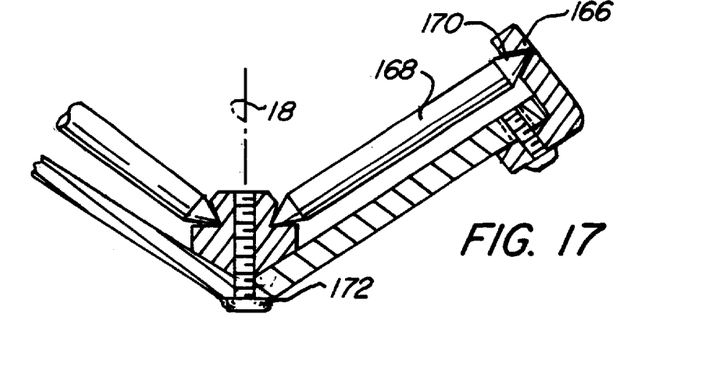
FIG. 17 is a cross-sectional view of the base support taken along lines C—C of FIG. 16.

In accordance with still another aspect of the invention, the guide assembly 30 formed on the base 14 is illustrated in FIGS. 15–17. The base 14 has a generally V shape formed with a central support 160 that is centered along the axis 18 and has a plurality of angularly spaced apart openings 162. The central support may be removably attached to the base 14 by a fastener 172 or may be integrally machined therewith. The guide assembly further includes corner supports 164 each removably mounted on the base and having generally L-shaped sides which are fastened to the base 14 by fasteners 174. Each of the corner supports has an opening 166 that is aligned with the respecting opening 162, so that each pair of aligned openings 162, 166 receives oppositely pointed roller ends 170 of a roller 168. The openings 162, 166 are sized so as to enable the free rotation of the rollers when performing the circular cut, and after turning the blade at a right angle, allowing the cable to be linearly displaced relative to the stripper with effective lower friction generated by the rollers. Preferably, the guide assembly has four rollers arranged to form a generally X configuration that along with the spreading halves of the V-shaped base allow progressively greater support while switching to larger outside diameter cables.

While the above disclosure has described various aspects of the present invention, the latter is not limited thereto, and is susceptible to numerous changes and modifications as known to those skilled in he art. Therefore, the invention is not limited to the details shown and described herein, and includes all such changes and modifications as are encompassed by the scope of the appended claims.

What I claim is:

1. A cable stripper comprising:
   a support extending along a longitudinal axis;
   a carriage slidably mounted to said support so as to adjustably clamp a cable to be stripped between itself and said support;
   a blade actuator axially slidably mounted to said carriage and rotatable about a blade axis parallel to said longitudinal axis;
   a blade operatively connected to said blade actuator and rotatable therewith between at least two angular positions, wherein said blade is oriented in two cutting planes that extend transversely to each other, said blade being rotationally disengageable from said blade actuator in each of said two angular positions to be axially displaceable relative to said blade actuator, so as to controllably penetrate the cable to be stripped at a predetermined thickness to produce cuts in said cutting planes, said blade actuator including a blade actuating assembly enabling angular and axial displacement of the blade and having a cam mechanism which receives said blade to rotate about the blade axis, said cam mechanism including:
   a blade knob,
   a knob sleeve fixed to said blade knob and extending axially inwardly therefrom, said knob sleeve being formed with a spirally recessed cam surface, said cable stripper further comprising a blade sleeve axially fixed to said blade knob, said blade sleeve being rotatable with said blade knob between said two angular positions wherein blade sleeve's rotation is arrested, said blade sleeve having an axial slot that opens into said recessed cam surface; and
   a dial assembly rotatable to enable said blade to penetrate the cable at a predetermined depth.

2. The cable stripper defined in claim 1 further comprising a drum assembly axially fixed to said blade sleeve to enable said cam mechanism to axially move with respect to said dial assembly during setting a predetermined blade penetration.

3. The cable stripper defined in claim 2 wherein said drum assembly comprising:
   a drum sleeve surrounding said blade sleeve, said blade being axially displaceable in said blade sleeve between outer and inner axial positions of said blade in each of said two angular positions, and
   a U-shaped cup provided on said drum sleeve and extending axially toward said blade knob, said U-shaped cup having a pair of axial recesses spaced angularly from each other at a distance which corresponds to a length of said recessed cam surface.

4. The cable stripper defined in claim 3 wherein said spirally recessed cam surface has flat end portions so as to prevent voluntary axial retraction of said blade in said inner axial position thereof.

5. The cable stripper defined in claim 4 wherein each of said flat_end portions is within a 10–20° range.

6. The cable stripper defined in claim 3 wherein said axial recesses are spaced at a 90° angle.

7. The cable stripper defined in claim 3 further comprising a lever extending radially through said spirally recessed cam surface of said knob sleeve and through said axial slot of said blade sleeve and detachably fixed to said blade so as to move angularly and axially therewith.

8. The cable stripper defined in claim 7 wherein said lever is engageable in each of said pair of axial recesses to move axially therein with said blade between said outer and inner axial positions thereof as said blade knob continues its angular displacement upon reaching each of said angular positions.

9. The cable stripper defined in claim 8 wherein axial displacement of said lever and angular displacement if said blade knob are arrested upon reaching a bottom of each axial recess of said U-shaped cup, so as to correspond to a predetermined blade penetration set by said dial assembly.

10. The cable stripper defined in claim 7 wherein said pair of axial recesses define a segment of a peripheral wall of said U-shaped cup which is axially shorter than the rest of said peripheral wall, so as angular displacement of said lever and said blade sleeve is arrested in said angular positions.

11. The cable stripper defined in claim 10 wherein said lever engages said recessed cam surface translating rotational displacement of said knob sleeve into axial displacement of said blade.

12. The cable stripper defined in claim 7 wherein said blade has a pair of edges axially converging toward a blade tip lying on said blade axis, said lever being aligned with said blade tip so as to indicate a respective cutting plane of said blade.

13. The cable stripper defined in claim 7 wherein said knob sleeve has an inner axial end formed with an axial pocket receiving a spring loaded element biasing said outer knob sleeve so as to allow said lever to be in continuous contact with said recessed cam surface.

14. The cable stripper defined in claim 3 wherein said drum sleeve has an outer thread threadedly engaging said dial assembly as said drum sleeve moves axially between said dial assembly and said cam mechanism during rotation of said dial assembly.

15. The cable stripper defined in claim 14 wherein said dial assembly includes:
a rotary dial fixed to said cartridge so as to move axially therewith, and
an inner nut rotationally fixed to said rotary dial and having an inner thread engaging the outer thread of said drum sleeve to displace it axially upon rotating said rotary dial so as to establish a predetermined blade penetration.

16. The cable stripper defined in claim 15 wherein said dial assembly further includes a dial stop displaceable perpendicular to said longitudinal axis and detachably connected to said rotary dial so as to arrest rotation thereof upon establishing a predetermined blade penetration.

17. The cable stripper defined in claim 16 wherein said dial stop has a set screw removably attaching the rotary dial to said nut and adapted to be unscrewed to enable said rotary dial to rotate relative to said nut in a zero position.

18. The cable stripper in claim 16 wherein said rotary dial has an English scale graduated in thousands of an inch.

19. The cable stripper defined in claim 18 wherein said rotary dial has a metric scale.

20. The cable stripper defined in claim 16 wherein said dial stop includes an axial edge pointing radially toward said longitudinal axis and engaging a textured surface of said rotary dial upon displacing the dial stop to arrest its displacement upon reaching a predetermined blade penetration.

21. The cable stripper defined in claim 20 wherein said dial stop has a plate formed with said axial edge.

22. The cable stripper defined in claim 20 wherein said dial stop has
a slot traversed by an axially extending pin that attaches said dial stop to said cartridge, and
a spring element in said slot and pressing against said pin, so as to bias said dial stop in a position wherein said axial edge is disengaged from said textured surface.

23. The cable stripper defined in claim 22 wherein said dial stop has another slot receiving an axially extending post that has a surface juxtaposed with said U-shaped cup and adapted to indicate the number of turns of said rotary dial reflecting the blade penetration upon displacing said U-shaped cup.

24. A cable stripper comprising:
a support extending along a longitudinal axis;
a carriage slidably mounted to said support so as to adjustably clamp a cable to be stripped between itself and said support;
a blade actuator axially slidably mounted to said carriage and rotatable about a blade axis parallel to said longitudinal axis;
a blade operatively connected to said blade actuator and rotatable therewith between at least two angular positions, wherein said blade is oriented in two cutting planes that extend transversely to each other, said blade being rotationally disengageable from said blade actuator in each of said two angular positions to be axially displaceable relative to said blade actuator, so as to controllably penetrate the cable to be stripped at a predetermined thickness to produce cuts in said cutting planes, said blade actuator including a blade actuating assembly enabling angular and axial displacement of the blade and having a cam mechanism which receives said blade to rotate about the blade axis.

25. The cable stripper defined in claim 24 wherein the blade actuator includes a dial assembly rotatable to enable said blade to penetrate the cable at a predetermined depth.

26. A cable stripper comprising:
a support extending along a longitudinal axis and formed with a bottom; a cartridge axially displaceable along said support;
a cartridge stop releasably engaging said cartridge upon axial displacement thereof to a clamping position, wherein said cartridge presses a cable to be stripped against said bottom, said cartridge stop having a housing slidable perpendicular to said longitudinal axis to a release position upon applying an external force, wherein said cartridge is able to move axially, and an L-shaped bracket on top of said housing arresting displacement thereof in said release position;
a blade actuator mounted to said cartridge and displaceable therewith to said clamping position, said blade actuator being axially and rotatably displaceable relative to said cartridge in said clamping position;
a blade operatively connected to said blade actuator and rotatable therewith between a plurality of angular positions wherein said blade is oriented in cutting planes that extend transversely to one another, said blade being rotationally disengageable from said blade actuator in each of said angular positions to be axially displaceable at a predetermined distance; and a depth adjuster axially fixed to said support and rotatable to enable axial displacement of said cartridge from said clamping position to a cutting position of said blade, wherein said blade penetrates a jacket of said cable at said predetermined distance, said depth adjuster including an axially extending screw traversing said cartridge stop and a screw button fixedly mounted to an outer end of said screw and rotatable upon applying an rotational torque.

27. The cable stripper defined in claim 26 wherein said housing has a recessed end formed with a slit extending transversely to said longitudinal axis and slidably receiving a removable plate that has at least one cutoff end receiving a spring element.

28. The cable stripper defined in claim 27 wherein said spring element is a conical spring.

29. The cable stripper defined in claim 27 said cutoff end of said removable plate and said recessed end of said housing are inwardly curved.

30. The cable stripper defined in claim 27 wherein said spring element is braced between said housing and said L-shaped bracket, so as to bias said housing in a locked position, wherein axial displacement of said cartridge is arrested.

31. The cable stripper defined in claim 30 wherein said housing further has an opening spaced from said recessed end and traversed by said screw, said slit being sized to enable said removable plate to latch into a thread of said screw in said locked position.

32. The cable stripper defined in claim 31 wherein said slit is inclined with respect to a horizontal to conform to a pitch angle of said thread, so as to enable said cartridge to be axially displaced upon actuating said screw button in said clamping position of the cartridge.

33. The cable stripper defined in claim 31 wherein said screw is a square thread lead screw.

34. The cable stripper defined in claim 31, further comprising a pair of spaced apart axial guides flanking said crew and traversing said cartridge stop.

35. A cable stripper comprising:
a support extending along a longitudinal axis and having a base;
a carriage axially slidable along said support to clamp a cable to be stripped in a clamping position between itself and said base;
a blade actuator axially and angularly displaceable relative to said carriage;
a blade operatively connected to said blade actuator and rotatable therewith between at least two angular positions wherein said blade is oriented in two cutting planes that extend transversely to each other, said blade being rotationally disengageable from said blade actuator in each angular position to be axially inwardly displaceable relative to said blade actuator, so as to controllably penetrate the cable at a predetermined distance; and
a plurality of rollers mounted freely rotatable about roller axes on said base, said roller axes extending angularly toward one another and transversely to said longitudinal axis and positioned so as to enable the cable to move rotationally and linearly relative to said support to sequentially produce circular and linear cuts upon penetration of said blade into the cable at said predetermined distance.

36. The cable stripper defined in claim 35 wherein said base is V-shape and has a central support aligned with said blade and a plurality if corner brackets, said rollers being journaled between said central support and said corner brackets to form an X-configuration.

* * * * *